E. DUFFEE.
DRY GAS PURIFIER.

No. 114,275.  Patented May 2, 1871.

Witnesses
Chas Dunham
F. C. Hale

Edward Duffee
by his attorney
F. P. Hale

UNITED STATES PATENT OFFICE.

EDWARD DUFFEE, OF HAVERHILL, MASS., ASSIGNOR TO AMERICAN GAS SCREEN MANUFACTURING COMPANY, OF SAME PLACE.

IMPROVEMENT IN DRY-GAS PURIFIERS.

Specification forming part of Letters Patent No. 114,275, dated May 2, 1871.

*To all whom it may concern:*

Be it known that I, EDWARD DUFFEE, of Haverhill, in the county of Essex and State of Massachusetts, have invented a new and useful Improvement in Dry-Gas Purifiers; and I do hereby declare the same to be fully described in the following specification, and represented in the accompanying drawings, of which—

Figure 1:
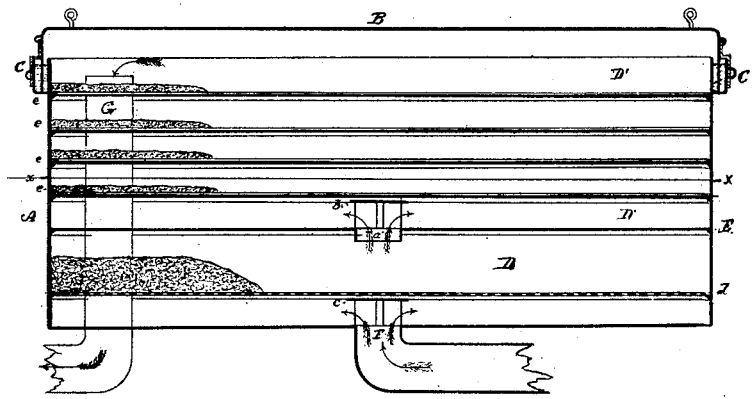
Figure 2:
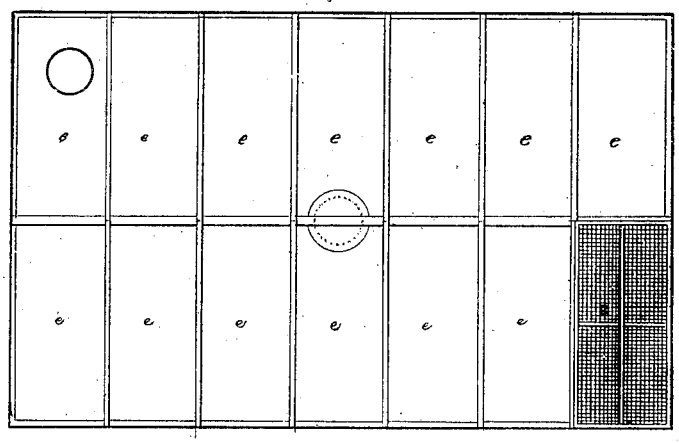

Figure 1 denotes a central, vertical, and longitudinal section; Fig. 2, a horizontal section on line $x$ $x$ of Fig. 1, and Fig. 3 a transverse section of a gas-purifying box embodying my invention.

Gas-purifying boxes as heretofore made have been constructed with but a single chamber, in which the purifying materials have been arranged in a series of successive layers disposed one over another. The iron filings or comminuted iron, breeze, or loam employed for the purpose of removing the sulphur, coal-tar, and ammonia from the gas were disposed in a mass upon foraminous screens or trays near the bottom of the box, while the several layers or strata of lime for removing the carbonic acid and excess of ammonia, &c., were arranged directly over the same. Owing to the strong affinity of the lime for the carbonic acid and other impurities, such becomes soon surcharged therewith and required to be often changed. This changing of the screens or trays containing the lime caused large quantities of it to fall from or drop through their foraminous bottoms and mingle with the mass of iron filings or oxide of iron disposed underneath, which not only seriously impaired the action of the iron as a remover of impurities, but prevented the restoral of its purifying energy when such had become exhausted, and was taken from the box or purifier and exposed to the action of the atmosphere in the ordinary manner, it being well known that the only thing required to free the mass of iron from its acquired impurities, when unmixed with lime, is to expose such mass, after its removal from the purifier, to the action of the atmosphere or an active current of air, the great heat generated by the chemical action resulting therefrom dissipating or destroying most if not all the foreign accretions and rendering the iron again an active rejuvinated agent; but when lime has become thus mixed with the oxide or mass of iron, and the latter has once become saturated with the impure elements, the power of revivifying such is lost and the whole is thrown away as useless. To prevent this intermingling of the hydrated lime and the iron oxide or mass of iron, and thus enable the latter after having become charged with the impurities to its capacity, to be readily restored to its normal active condition is the object of my invention, which consists in forming the interior of the box into two horizontal chambers by means of a tight flooring or partition, which prevents any intermingling of the lime with the other purifying agents employed.

Figure 3:
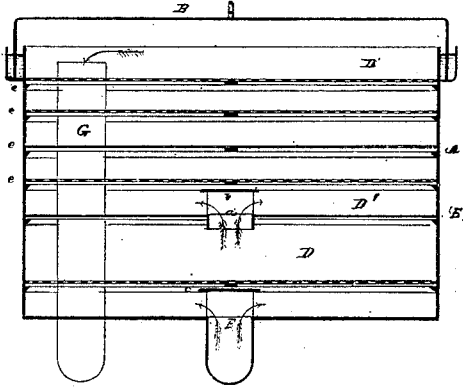

In the said drawings, A denotes a rectangular case or box, of any suitable dimensions, the same having a cover, B, which is connected with the said box by means of a water-joint in the ordinary manner, the said cover being firmly affixed to the said case by means of locking devices C C', as shown in Fig. 1, the same making a strong and gas-tight connection between the two when closed. The cover enables the series of screens or trays to be removed and replenished whenever it may be desirable. The interior of the said case I divide into two separate chambers, D D', by means of a removable horizontal flooring or partition, E, which is perfecty tight, so as to intercept any lime which may fall from or through the meshes of the screens or trays disposed above it. There are, however, two orifices, $a$ $a'$, made through the same, through one of which the outlet-pipe passes. The other orifice—viz., $a'$—is provided with a guard or annular cap, $b$, of greater diameter than the said orifice, such guard being mounted upon legs disposed at such distance above the said orifice as to allow a free entrance of gas into the upper chamber. The lower chamber, D, is furnished with an induction pipe or orifice, F, which is also protected by an annular guard, $c$, arranged as shown in Figs. 1 and 3, the function of which is to prevent any of the material upon the screen above it from falling into the said pipe. Just above the top of the said guard a foraminous flooring or series of perforated trays or screens, $d$, are disposed horizontally, the same being to receive a mass of iron filings or comminuted iron, breeze, or other purifying material.

Within the upper chamber, D, a series of perforated screens or trays, e, are arranged, one above another, the same being supported upon ledges, (formed on the sides of the chamber,) and bars e e extending longitudinally through the center of the chambers and resting upon the said ledges, each of the several trays being provided with a layer of hydrated lime.

G is the eduction-pipe, which is disposed near one end of the said box, the same being arranged with its mouth near the top of the upper chamber and extending down through both chambers and out of the bottom of the lower chamber, as seen in Figs. 1 and 3.

Having described my invention, its operation is as follows: If we suppose the entire area of the foraminous platform or series of screens of the lower chamber to be covered with a mass of iron filings, breeze, or loam, and the series of trays or screens in the upper chamber to be covered with layers of hydrated lime, the gas on entering the induction-orifice flows into the space below the charge of iron filings or its equivalent, next up through the same, by which the coal-tar, sulphur, and a large percentage of the ammonia are absorbed. After having thus been partially purified the gas next passes up through the orifice a' into the upper chamber, and by traversing the several layers of lime, the carbonic acid and the excess of ammonia and other impurities are removed, the gas passing down the eduction-pipe to the station-meter.

My invention, although simple in its character, is, as experience has demonstrated, one of great value and effects a great saving in the cost of the purification of the gas.

What I claim as my invention is as follows:

In a dry-gas purifier constructed as above described, the arrangement of an intercepting partition, E, below the lower series of lime-screens, in manner and for the purpose set forth.

EDWARD DUFFEE.

Witnesses:
LUTHER DAY,
S. D. MAYNARD.